Oct. 6, 1970 C. W. SOSINSKI 3,533,053

MODULE SYSTEM

Filed Aug. 29, 1968 3 Sheets-Sheet 1

INVENTOR.
CHARLES W. SOSINSKI
BY [signature]
ATTORNEY

INVENTOR.
CHARLES W. SOSINSKY

BY [signature]

ATTORNEY

Oct. 6, 1970

C. W. SOSINSKI 3,533,053

MODULE SYSTEM

Filed Aug. 29, 1968

3 Sheets-Sheet 3

INVENTOR.
CHARLES W. SOSINSKI

BY

ATTORNEY

United States Patent Office 3,533,053

Patented Oct. 6, 1970

3,533,053

MODULE SYSTEM

Charles William Sosinski, Linden, N.J., assignor to Thomas & Betts Corporation, Elizabeth, N.J., a corporation of New Jersey

Filed Aug. 29, 1968, Ser. No. 756,254

Int. Cl. H01r *9/00*

U.S. Cl. 339—198 18 Claims

ABSTRACT OF THE DISCLOSURE

The disclosure is directed to an overall module system wherein individual component portions may be joined together by means of interconnection systems such that both their back and front faces may be employed for the interconnection of electronic components, or conductors. The combined module is formed of two component module portions each having an insulating module housing containing therein a plurality of bores extending from front faces to rear faces thereof. Within each of the bores is placed a retention means such that male and female electrical connectors, inserted from opposite faces thereof, will be held in intimate mechanical and electrical contact. Interconnection means are provided to join the portions to provide feed-through connections between such portions. Interconnection is achieved by means of extensions upon the male pins of associated module portions such that a first of the male pins has thereon a further male contact tab and a second has a female contact tab which may be coupled so as to form a complete feed-through from the first module to the second module composing the system. In other embodiments, combined double faced male pins are employed wherein the male pins and interconnection bus bars are fabricated as a single unit and are coupled to female connectors inserted from opposite faces of the modules.

CROSS REFERENCES TO RELATED APPLICATIONS (1) Module Mounting System, by Charles W. Sosinski, Ser. No. 724,033, filed on Apr. 25, 1968; (2) Module Extraction Tool, by Charles W. Sosinski, Ser. No. 731,671, filed on Apr. 26, 1968; (3) Module Mounting System, by Charles W. Sosinski, Ser. No. 749,883, filed on Aug. 2, 1968; and (4) Module, by Charles W. Sosinski, Ser. No. 750,265, filed on Aug. 5, 1968.

BACKGROUND OF THE INVENTION

Field of the invention

The invention is directed to the field of interconnecting electrical components and conductors such that the components and conductors may be coupled to either face of a module system.

Description of the prior art

In prior art devices, modules are provided wherein electrical conductors, or components, may be coupled to one another employing only a single face of an electrical module. Such modules are arranged in racks and have necessary interconnections between respective coupling means carried out in the front face thereof. The front face is sealed and is mounted in such a way that it is not accessible. As a result, all interconnections of components and conductors must be done on the so-called rear face of the module. It is not possible with prior art devices to make certain of the interconnections semi-permanent, or put components on the modules themselves, in such a manner so that they will not be disturbed when the connections are made on the rear face of the connector. The usual practice found in such prior art devices, where it is desired to mount components, is to separately mount components upon component boards and interconnect these components by means of conductors brought from such component boards to the connector. Such a manner of interconnection introduces long leads from the components to the connectors which in addition to effecting the electrical properties of the system are unsightly and often interfere with use of the connector. Further, there is no provision made in such connectors, as found in the prior art, for the feed-through of components, or conductors, from a first face of the module to a second face wherein interconnection may be made on either face of the module.

SUMMARY OF THE INVENTION

The present invention overcomes the difficulties noted above with respect to prior art devices by providing a module having two exposed faces, both of which may be employed for the interconnection of conductors or components. Further, the module is arranged for feed-through operation such that a continuous electrical path is provided from a first face to a second face of the module, both of which faces are available for use. This is accomplished by the use of a module system composed of two module components which may be joined together, both mechanically and electrically, to provide feed-through interconnection from a first face of a module to a second face. Each of the module portions is composed of an insulating module block having therethrough a number of bores. In each of the bores is placed a retention sleeve which permits the insertion and retention of male and female contact pins. The interconnection system provided from one module portion to the other, in order to provide an overall module, can take a number of forms as is described in this invention. In a first of these forms certain of the connectors are provided with male tabs whereas on the associated module portion the female cavities, for receiving the male tabs, are provided. The module portions may then be joined in a male-female relationship so as to provide feed-through interconnection between the retention sleeves and connectors therein of one module portion and the other. In further embodiments of the invention a combined bus bar-male interconnection pin is provided. In such arrangement the bus bar forms a central unit and formed thereon, or joined thereto, are a plurality of male contact pins which extend from both sides of the bus bar and are adapted to engage with the retention sleeve of associated ones of the module portions. Locating-positioning devices are employed at the interconnecting faces of the module portions to permit the insertion and locking of the combined male contact pin-bus bar assembly. In a first embodiment, plastic locater-positioning plates are locked to the retention sleeves of both of the module portions and an epoxy layer and a resilient layer are placed between such locater-positioning plates. In such an arrangement complete isolation is achieved between the bus bar interconnection system and the module portions themselves. In a further embodiment, the boss portions of the locater-positioning plates may be plated to provide electrical contact between the retention sleeves and the male connector pin-bus bar arrangement such that a secondary electrical path is provided. In a further embodiment, a metal sleeve is added to the ends of the bosses of the locater-positioning plate, such metallic sleeves being interconnected with the retention sleeves themselves, to provide secondary electrical paths to the male connector pin-bus bar arrangement. In a further embodiment, a modification of the retention sleeve provides a secondary electrical path between the retention sleeve and the male connector pin-bus bar arrangement. It is therefore an object of this invention to provide an improved form of module interconnection system.

It is yet another object of this invention to provide an improved form of module interconnection system wherein two module portions may be joined in order to form a unitary module arrangement with a feed-through characteristic.

It is still another object of this invention to provide an improved module system wherein two module portions may be joined by means of a male pin-bus bar arrangement such that isolation of the two module portions is achieved.

It is still another object of this invention to provide an improved module system wherein the two component portions of the module system provide secondary electrical contact paths between the electrical connectors placed within the module portions.

It is yet another object of this invention to provide an improved module system wherein two module portions may be joined into a unitary module employing modified electrical connector pins of the type normally employed with the modules.

Other objects and features of the invention will be pointed out in the following description and claims and illustrated in the accompanying drawings, which disclose, by way of example, the principles of the invention, and the best modes which have been contemplated for carrying them out.

BRIEF DESCRIPTION OF THE DRAWINGS

In the drawings.

Similar elements will be given similar reference characters in each of the respective figures.

DESCRIPTION OF THE PREFERRED EMBODIMENTS

Figure 2:
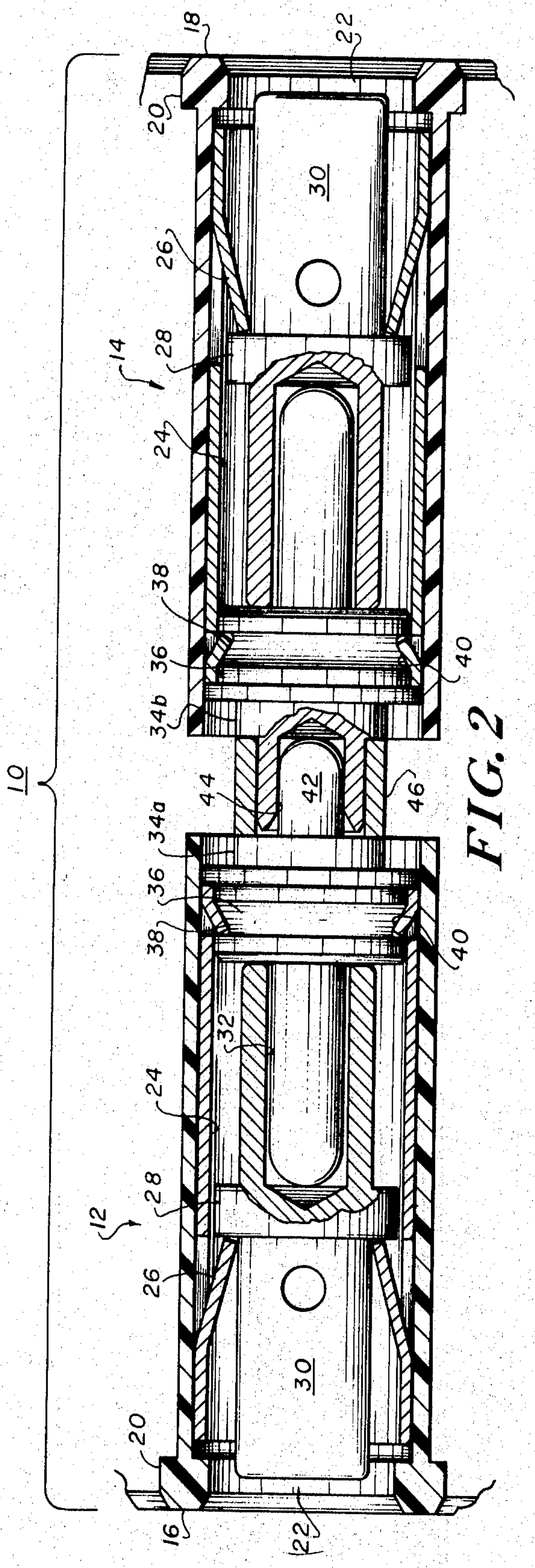
FIG. 2 is a side elevation, partially in section, illustrating details of the module of FIG. 1 according to a first embodiment.
Figure 1:
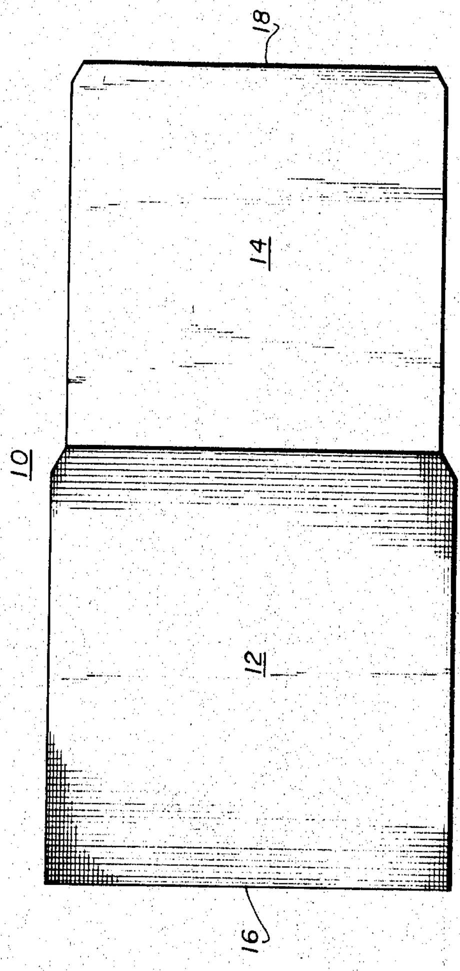
FIG. 1 is a side elevation of an assembled module constructed in accordance with the concepts of the invention.

Turning now to FIG. 1 there is shown a side elevation of a module 10 constructed in accordance with the concepts of the invention. The module 10 is composed of module portions 12 and 14 arranged to be interconnected such that components, or conductors, inserted with proper connectors at a rear face 16, of portion 12, may be coupled to electrical components, or conductors, at the rear face 18 of the portion 14. Modules of this general type, and means for mounting such modules, are shown, described and claimed in the copending application No. 3, cited above, which is herein incorporated by reference. The details of the module itself, and the component portions thereof, are shown in FIG. 2 and will now be briefly discussed. For a more complete description of the component portions of the module, reference is made to application No. 4, cited above, which is herein incorporated by reference. Module portions 12 and 14 each have insulating housings 20 having bores 22 therethrough. Placed within the bores are retention sleeves 24 each of which have first stop members 26 struck from their sides. The stop members 26 will engage with the collar portions 28 of female connector pins 30 placed within them. As described above in application No. 4, insertion of the female connector pin 30 will cause the displacement of the first stop members 26 until the colar 28 of the connector pin 30 has passed the stop members 26 at which time they will be allowed to return to the position shown in FIG. 2 engaging the rear surface of the collars 28 and preventing withdrawal of the female connector pins 30. The female connector pins 30 will have a bore 32 therein to receive a male connector pin 34. The shoulders 36, of the male connector pins 34, will have an angular groove 38 thereabout to receive therein, in locking engagement, second stop members 40 struck from the retention sleeve 24. As is described in application No. 4, upon the insertion of the shoulder portion 36 of the male connector pin 34, the second stop members 40 will be deflected out of their positions until such time as the cavity 38, of the shoulders 36, have passed thereby and allow the stop members 40 to return to the positions shown, thus locking the male connector pins 34 in the position shown. Male connector pin **34*a* has at its opposite end a male tab 42, whereas male connector pin 34*b* has at its opposite end a cavity 44 for receipt therein in locking engagement the male tab 42 of the connector pin 34*a*. A bus bar 46 is provided, with apertures therein, for receiving the female cavity portion 44 of the connector pin 34*b* therethrough and thence to receive therein the male connector pin tab 42 of the connector 34*a*. By providing a close mechanical fit between the apertures within the bus bar 46 and the outer diameter of the female portion of the male connector pin 34*b*, the bus bar 46 and connector pins 34*a* and 34*b* will be held in a unitary manner. The portions 12 and 14 of the module 10 will then be joined and will be held together by means of the mounting system described above with reference to application No. 3. If desired, hermetic sealing may also be introduced between the module portions 12 and 14 in order that the unit be totally sealed and moisture, dirt and other foreign materials be prevented from entering within the module 10**.

Figure 3:
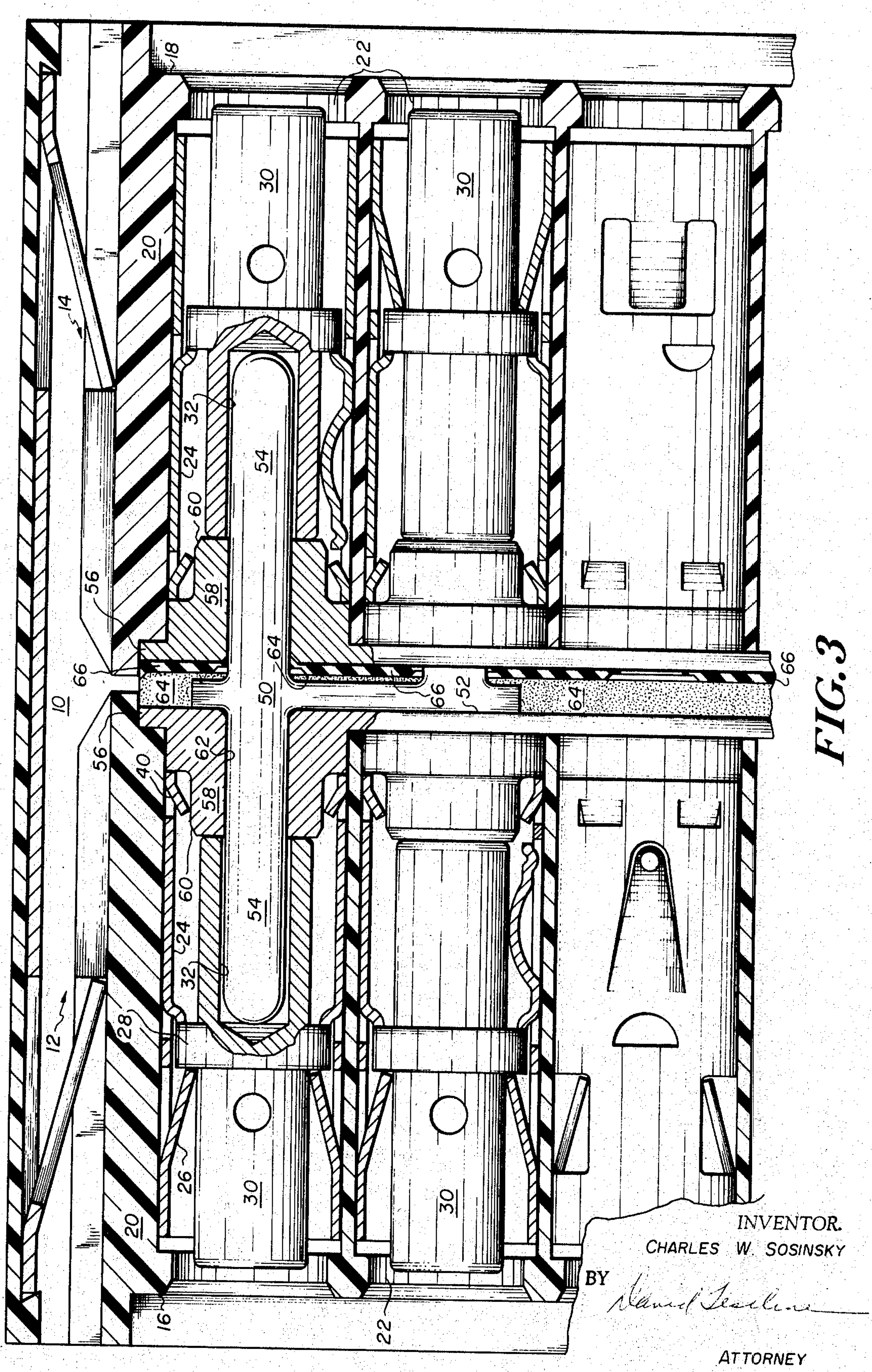
FIG. 3 is a side elevation, partially in section, illustrating details of a module according to a further embodiment.

Turning now to FIG. 3 there is shown a side elevation, partially in section, of an alternative arrangement of the module of FIG. 1. In this arrangement, rather than providing the individual male connector pins **34*a* and 34*b* with male and female portions for engaging to permit the assembly of module portion 12 and 14, the module portions 12 and 14 are made identical and a preassembled bus bar-male pin interconnection device is employed to couple the module portions 12 and 14 into an overall module 10. Male connector pin-bus bar assembly 50 consists of a bus bar portion 52 and male connector pins 54. In order to position the male connector pin 54 within the cavities 22, a locater-positioning plate 56 is provided for each of the module portions 12 and 14. The locater-positioning plate 56 has a plurality of bosses 58 which are chamfered as at 60. The chamfered portions 60 of the bosses 58 will cause the deflection of the second stop members 40 until such time as the main portion of the boss 58 is adjacent the stop members 40 at which time they will engage the bosses 58 and retain the locater-positioning plate 56 in position. The locater-positioning plate 56 is constructed of a plastic type material such so that the stop members 40 will bite into the surface of the bosses 58 thus causing the desired locking action. An aperture 62 is provided within the boss 58 to permit the passage therethrough of the male connector pin 54. The male connector pins 54 will pass through the apertures 62 of the boss 58 and will enter the cavities 32 of the female connector pin 30, thus providing electrical contact between the female connector pin 30 and the male connector pin 54. Epoxy layer 64 is provided adjacent the back surface of a first one of the plates 56 to seal the plate 56 into the module. A resilient strip 66 is cemented adjacent the epoxy layer 64 and in contact with the second one of the locater-positioning plates 56 which is cemented to its associated module portion 14. The resilient material 66, compressed when the portions 12 and 14 of the modules 10 are joined, will exert forces upon the locater-positioning plates 56 and will thereby assure good contact between the male connector pins 54, female connector pins 30, the bosses 58 and the stop members 40. The resilient material also serves as a sealing member and exerts outward forces on the locking members which hold the module portions 12 and 14 together as described in application No. 3 above. The bus bar portion 52 can be formed as wide as is desired and the number of male connector pins 54 chosen to couple together as many of the cavities 22 as is desired. If desired, the bus bar connection pin device 50 may be fabricated for all cavities of the module 10, or be provided in portions, or may be provided as a unitary device with insulation therebetween to isolate individual portions of the bus bar 52 from other portions thereof. In the arrangement, as shown, the only path for electrical conductivity, from the female connector pins 30 to the male connector pins 54, will be via the cavity 32 of the female connector pins 30. No direct path will exist between the retention sleeves 24 and the male connector pins 54 in that the bosses 58 of the locater-positioning plate 56 are plastic. However, should a secondary path be desired, bosses 58 may be plated with a metallic material such that a secondary electrical path will exist between the male connector pins 54 and the female connector pins 30 via the retention sleeve 24, the second stop members 40 and the metallic plating upon the bosses 58 which are in contact with the connector pins 54**.

Figure 4:
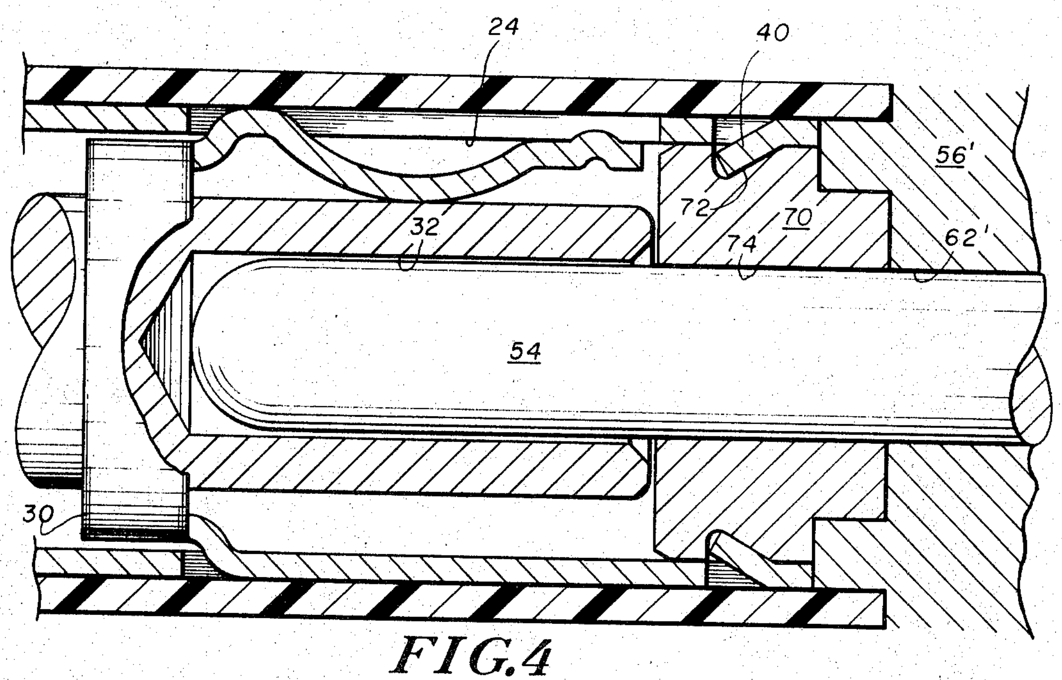
FIG. 4 is a side elevation, partially in section, showing the details of a further embodiment of a module system constructed in accordance with the concepts of the invention.

Turning now to FIG. 4, there is shown an alternative arrangement of the bus bar interconnection system. A modified locater-positioning plate 56' is provided with a metallic sleeve 70 for each one of the cavities 22. Metallic sleeve 70 is formed in a fashion similar to the collar 36 of the male connector pins 34*a* and 34*b* of FIG. 2. Each of the shoulders 70 will be provided with a cavity 72 to receive therein in locking engagement the second stop members 40. The male connector pin 54 will be inserted through the aperture 62' of the locater-positioning plate 56' and will enter through an aperture 74 within the metal sleeve 70. It will then continue into the cavity 32 of the female connector pin 30. In this arrangement a secondary electrical path is provided between the sleeve 24 and the male contact pin 54 via the path including the second stop member 40, the metallic sleeve 70 and the male contact pin 54.

Figure 5:
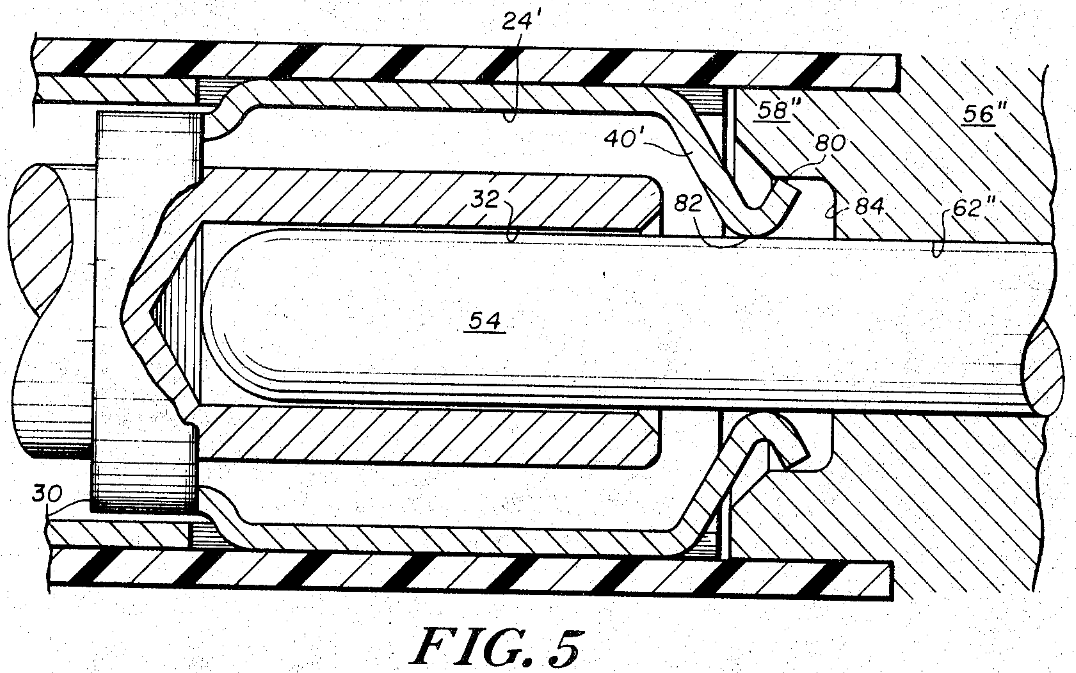
FIG. 5 is a side elevation, partially in section, showing the details of a further embodiment of a module system constructed in accordance with the concepts of the invention.

A further variation of the interconnection system, is shown in FIG. 5, to which reference is now made. In this arrangement the retention sleeve 24' has been modified such that the second stop member 40', struck from its end, is now in the form of a U-shaped member having a free end 80 and a U-shaped crest 82. The locater-positioning plate 56'' is provided with a boss 58'' having thereon undercut section 84. A male connector pin 54 is passed through the aperture 62'' and allowed to enter the cavity 32 of the female connector pin 30. The length and shape of the second stop member 40' is such that with the male connector pin 54 positioned within the aperture 62'', of the locater-positioning plate 56'', the U-crest portion 82 of the second stop 40' will engage the male connector pin 54 while the free end 80 will engage the boss 58'' of the locater-positioning plate 56''. On the initial insertion of the locater-positioning plate 56'' some engagement will be achieved between the free end 80 and the second stop member 40', however, this engagement is increased by the insertion of the male connector pin 54 which will force the free end 80 of the stop 40' into biting engagement with the boss 58'' of the locater positioning plate 56''.

In both of these arrangements, that is the arrangements of FIGS. 4 and 5, an epoxy layer 64 and a resilient layer 66, as shown in FIG. 3, will be employed between the joined portions 12 and 14 of the module 10. Again, in the devices of FIGS. 4 and 5 there will be secondary electrical paths provided through the retaining sleeves 24 and 24' and the male connector pins 54.

While there have been shown and described and pointed out the fundamental novel features of the invention as applied to the preferred embodiments, it will be understood that various omissions and substitutions and changes of the form and details of the devices illustrated and in their operation may be made by those skilled in the art without departing from the spirit of the invention.

The embodiments of the invention in which an exclusive property or privilege is claimed are defined as follows:

What is claimed is:

1. A module system wherein conductors and components can be introduced from both of two opposite faces comprising: first and second module bodies, each having at least one bore therethrough from a first face thereof to a second face thereof; a plurality of retention sleeves, one for each bore, positioned in said bores; said retention sleeves each having at least one first stop member thereon to releasably retain a first type of electrical connector therein and at least one second stop member thereon to retain a second type of electrical connector therein; and means for coupling together the associated retention sleeves of associaed bores in both of said first and second module bodies; said means engaging said second stop members of said associated retention sleeves and providing electrical contact between first types of electrical connectors placed in said bores from opposite faces thereof and engaging associated first stop members.

2. A module system, as defined in claim 1, wherein said means comprises second types of electrical connectors, one for each retention sleeve and engaging said second stop members; first ones of said second types of electrical connectors having a tab thereon; second ones of said second types of electrical connectors having a cavity therein to receive therein the tab of said first ones of said second types of electrical connectors whereby said first ones and second ones of said second types of electrical connectors can be selectively coupled together.

3. A module system wherein conductors and components can be introduced from both of two opposite faces comprising: first and second module bodies, each having at least one bore therethrough from a first face thereof to a second face thereof; a plurality of retention sleeves, one for each bore, positioned in said bores; said retention sleeves each having at least one first stop member thereon to releasably retain a first type of electrical connector therein and at least one second stop member thereon to retain a second type of electrical connector therein; means for coupling together the asociated retention sleeves of associated bores in both said first and second module bodies and providing electrical contact between first types of electrical conductors placed in said bores from opposite faces thereof and engaging associated first stop members; said means comprising second types of electrical connectors, one for each retention sleeve and engaging said second stop members; first ones of said second types of electrical connectors having a tab thereon; second ones of said second types of electrical connectors having a cavity therein to receive therein the tab of said first ones of said second types of electrical connectors to permit first ones and second ones of said second types of electrical connectors to be selectively coupled together; and bus bar means having apertures therein, said bus bar means being arranged to selectively couple certain of said second types of electrical connectors; said tab of said first ones and said cavity of said second ones of said second types of electrical connectors extending into said bus bar means apertures to couple said bus bar means to said second types of electrical connectors.

4. A module system wherein conductors and components can be introduced from both of two opposite faces comprising: first and second module bodies, each having at least one bore therethrough from a first face thereof to a second face thereof; a plurality of retention sleeves, one for each bore, positioned in said bores; said retention sleeves each having at least one first stop member thereon to retain a first type of electrical connector therein and at least one second stop member thereon to retain a second type of electrical connector therein; means for coupling together the associated retention sleeves of associated bores in both of said first and second module bodies; said means engaging said second stop members of said associated retention sleeves and providing electrical contact between first types of electrical connectors placed in said bores from opposite faces thereof and engaging associated first stop members; said means for coupling comprising: bus bar means; a plurality of second types of electrical connectors, one for each of said bores of said first and second module bodies; and means for coupling said second types of electrical connectors to said bus bar means in asosciated pairs.

5. A module system wherein conductors and components can be introduced from both of two opposite faces comprising: first and second module bodies, each having at least one bore therethrough from a first face thereof to a second face thereof; a plurality of retention sleeves, one for each bore, positioned in said bores; said retention sleeves each having at least one first stop member thereon to retain a first type of electrical connector therein and at least one second stop member thereon to retain a second type of elcetrical connector therein; and means for coupling together the associated retention sleeves of associated bores in both of said first and second module bodies; said means engaging said second stop members of said associated retention sleeves and providing electrical contact between first types of electrical connectors placed in said bores from opposite faces thereof and engaging associated first stop members; said means for coupling comprising: bus bar means having a plurality of second types of electrical connectors, one for each of said bores of said first and second module bodies, formed thereon.

6. A module system, as defined in claim 5, further comprising positioning means positioned adjacent the front face of each of said first and second module bodies; a plurality of hubs on said positioning means, one hub for each of said bores in said module body; said hubs extending into said bores and engaging said second stop members; said hubs having apertures therein to receive therein said second types of electrical connectors on said bus bar means to position said second types of electrical connectors within their associated retention sleeves.

7. A module system, as defined in claim 6, further comprising an epoxy means for coupling together the associated positioning means of said first module body and said first module body.

8. A module system, as defined in claim 7, further comprising a resilient member placed adjacent said epoxy means and between said associated positioning means, said resilient member sealing said associated bores and improving the mechanical contact between said positioning means and said second stop members.

9. A module system, as defined in claim 8, wherein said positioning means, said epoxy means and said resilient means are insulating.

10. A module system, as defined in claim 9, wherein said positioning means is metal plated to provide an electrically conductive path between said retention sleeve, said positioning means and said second type of electrical connectors.

11. A module system, as defined in claim 5, further comprising a plurality of collars, one for each of said plurality of second types of electrical connectors; one of said collars being coupled to each of said second types of electrical connectors; said collars engaging said second stop members to retain said bus bar means in said bores.

12. A module system, as defined in claim 11, wherein said collars are metallic and provide an alternate electrical path between said first types of electrical connectors.

13. A module system, as defined in claim 11, further comprising positioning means positioned adjacent the front face of each of said first and second module bodies; a plurality of hubs on said positioning means, one hub for each of said bores in said module body; said hubs extending into said bores and coupled to said collars.

14. A module system, as defined in claim 13, further comprising an epoxy means for coupling together the associated positioning means of said first module body and said first module body.

15. A module system, as defined in claim 14, further comprising a resilient member placed adjacent said epoxy means and between said associated positioning means, said resilient member sealing said associated bores and improving the mechanical contact between said positioning means and said second stop members.

16. A module system, as defined in claim 5, further comprising positioning means positioned adjacent the front face of each of said first and second module bodies; a plurality of hubs on said positioning means, one hub for each of said bores in said module body; said hubs extending into said bores; said second stop members are each U-shaped flexure members having free ends, said free ends engaging the hubs of said positioning means and the U-base of each of said flexure members engaging its associated ones of said second types of electrical connectors for providing an electrical path between said retention sleeves and the associated ones of said second types of electrical connectors.

17. A module system, as defined in claim 16, further comprising an epoxy means for coupling together the associated positioning means of said first module body and said first module body.

18. A module system, as defined in claim 17, further comprising a resilient member placed adjacent said epoxy means and between said associated positioning means, said resilient member sealing said associated bores and improving the mechanical contact between said positioning means and said second stop members.

References Cited

UNITED STATES PATENTS

| | | | |
|---|---|---|---|
| 2,967,289 | 1/1961 | Day | 339—215 X |
| 3,090,027 | 5/1963 | Phillips et al. | 339—63 X |
| 3,449,708 | 6/1969 | Lawrence et al. | 339—205 X |
| 3,221,291 | 11/1965 | Pratt | 339—213 |

FOREIGN PATENTS

| | | |
|---|---|---|
| 226,957 | 1/1925 | Great Britain. |

MARVIN A. CHAMPION, Primary Examiner

R. A. HAFER, Assistant Examiner

U.S. Cl. X.R.

339—205